United States Patent
Patel

(10) Patent No.: US 12,332,791 B2
(45) Date of Patent: Jun. 17, 2025

(54) COHERENCY MANAGEMENT USING DISTRIBUTED SNOOP

(71) Applicant: Akeana, Inc., San Jose, CA (US)

(72) Inventor: Sanjay Patel, San Ramon, CA (US)

(73) Assignee: Akeana, Inc., Santa Clara, CA (US)

(*) Notice: Subject to any disclaimer, the term of this patent is extended or adjusted under 35 U.S.C. 154(b) by 10 days.

(21) Appl. No.: 18/400,675

(22) Filed: Dec. 29, 2023

(65) Prior Publication Data
US 2024/0220412 A1    Jul. 4, 2024

Related U.S. Application Data

(60) Provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283,
(Continued)

(51) Int. Cl.
G06F 12/0815    (2016.01)
G06F 9/38       (2018.01)
G06F 12/123     (2016.01)

(52) U.S. Cl.
CPC ........ *G06F 12/0815* (2013.01); *G06F 9/3844* (2013.01); *G06F 12/123* (2013.01)

(58) Field of Classification Search
None
See application file for complete search history.

(56) References Cited

U.S. PATENT DOCUMENTS 6,934,809 B2    8/2005    Tremblay et al.
7,213,109 B1 *  5/2007    Bauman ............ G06F 12/0817
                                              711/E12.027
(Continued)

FOREIGN PATENT DOCUMENTS

WO    2022117687 A1    6/2022

*Primary Examiner* — Edward J Dudek, Jr.
*Assistant Examiner* — Ralph A Verderamo, III
(74) *Attorney, Agent, or Firm* — Adams Intellex, PLC

(57) ABSTRACT

Techniques for coherency management using distributed snoop requests are disclosed. A plurality of processor cores is accessed. The plurality of processor cores comprises a coherency domain. Two or more processor cores within the plurality of processor cores generate read operations for a shared memory structure coupled to the plurality of processor cores. Snoop requests are ordered in a two-dimensional matrix. The snoop requests are based on physical addresses for the shared memory structure. The two-dimensional matrix is extensible along each axis of the two-dimensional matrix. Snoop responses are mapped to a first-in first-out (FIFO) mapping queue. Each snoop response corresponds to a snoop request. Each processor core of the plurality of processor cores is coupled to at least one FIFO mapping queue. A memory access operation is completed, based on a comparison of the snoop requests and the snoop responses.

24 Claims, 8 Drawing Sheets

Related U.S. Application Data filed on Jun. 6, 2023, provisional application No. 63/467,335, filed on May 18, 2023, provisional application No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023, provisional application No. 63/436,133, filed on Dec. 30, 2022, provisional application No. 63/436,144, filed on Dec. 30, 2022.

(56) References Cited

U.S. PATENT DOCUMENTS

| | | |
|---|---|---|
| 7,343,515 B1 * | 3/2008 | Gilbertson .......... G06F 11/0724 714/10 |
| 7,506,105 B2 | 3/2009 | Al-Sukhni et al. |
| 10,013,356 B2 | 7/2018 | Chou |
| 10,671,394 B2 | 6/2020 | Britto et al. |
| 10,929,948 B2 | 2/2021 | Benthin et al. |
| 11,288,405 B2 | 3/2022 | Belgarric et al. |
| 11,403,099 B2 | 8/2022 | Cerny et al. |
| 11,403,225 B2 | 8/2022 | Zheng et al. |
| 11,429,529 B2 | 8/2022 | Hornung et al. |
| 11,442,863 B2 | 9/2022 | Shulyak et al. |
| 11,474,130 B2 | 10/2022 | Lentz et al. |
| 11,486,911 B2 | 11/2022 | Tuncer et al. |
| 11,868,282 B1 * | 1/2024 | Sonksen ............. G06F 12/0831 |
| 2008/0209133 A1 * | 8/2008 | Ozer ................... G06F 12/0831 711/146 |
| 2011/0055515 A1 * | 3/2011 | Khubaib ............. G06F 12/0833 711/E12.078 |
| 2013/0024629 A1 * | 1/2013 | Flanders ............. G06F 12/0831 711/146 |
| 2019/0163583 A1 * | 5/2019 | Fahim .................. G06F 12/084 |
| 2019/0171578 A1 * | 6/2019 | Patel .................... G06F 12/109 |
| 2022/0004639 A1 | 1/2022 | Yardi et al. |
| 2022/0029780 A1 | 1/2022 | Dafali |
| 2022/0197657 A1 | 6/2022 | Soundararajan et al. |

* cited by examiner

| CMO INSTRUCTION | ACE/CHI TRANSACTION (FROM CORES) | ACE/CHI TRANSACTION (TO CORES) |
| --- | --- | --- |
| CBO.ZERO | MAKE_UNIQUE | READ_UNIQUE |
| CBO.CLEAN | CLEAN_SHARED | READ_SHARED |
| CBO.FLUSH | CLEAN_INVALID | READ_UNIQUE |
| CBO.INVAL | MAKE_INVALID | READ_UNIQUE |

FIG. 7

COHERENCY MANAGEMENT USING DISTRIBUTED SNOOP

RELATED APPLICATIONS

This application claims the benefit of U.S. provisional patent applications "Coherency Management Using Distributed Snoop" Ser. No. 63/436,144, filed Dec. 30, 2022, "Return Address Stack With Branch Mispredict Recovery" Ser. No. 63/436,133, filed Dec. 30, 2022, "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023.

Each of the foregoing applications is hereby incorporated by reference in its entirety.

FIELD OF ART

This application relates generally to coherency management and more particularly to coherency management using distributed snoop.

BACKGROUND

Various tools, devices, and systems are designed to perform a wide variety of tasks. As time has progressed, new materials and advanced technologies have been developed. These new materials and technologies have improved existing tools and devices and have enabled the development of new systems with capabilities previously only imagined. The simple broom, which has existed in various forms for centuries, has evolved from cut branches to bundled straw to nylon bristles and beyond. While the broom is still in wide use today, other technologies have emerged which greatly improve the cleaning process. One improvement is based on the use of a vacuum. Early vacuum cleaners were awkward affairs which required the actuation of a piston or lever to create the vacuum used to collect dirt and debris from a surface. While these early examples may have been better suited to strength training than to cleaning, the vacuum was demonstrated to be an improvement over cleaning based on collecting dirt and debris to a central point for removal. The technological breakthrough that greatly improved the vacuum cleaner was the development of the electric motor. The electric motor could be used to create a much stronger vacuum and thereby improve the cleaning potential of the vacuum cleaner.

The electric motor has found seemingly innumerable domestic applications in areas other than cleaning. Electric motors are found in household devices including fans, refrigerators, and washing machines. The electric motor is finding increasing use in personal transportation as well, as the motors become more reliable and energy storage technology has evolved to increase vehicle range. Electric motors are also finding wide application in public utilities such as water systems. The electric motors can pump more water and can attain higher pressures than previously achievable. Electric pumps have also replaced old-fashioned vacuum pumps that were used to draw water from private wells. The electric pumps can also pump water from deeper wells, greatly improving the reliability of water systems.

While electromechanical systems such as the electric pump have improved performance of various tasks and, by extension, standards of living worldwide, even greater improvements can be achieved by the addition of integrated circuits or chips. An integrated circuit can be used to control the speed of the electric pump, to monitor pump operating points, and to protect the pump from damage, among many other desirable and useful features. Previous solutions based on mechanical techniques to control the electromechanical systems were highly complex and could not easily be adapted to a new application without a significant redesign. By contrast, the integrated circuit can be "updated" by rewriting code used to control the chip. For some integrated circuits, changes to the control of the electromechanical system are achieved by reprogramming the chip itself. The reprogramming of the chip essentially reconfigures the chip to change what functions the chip can perform. Whatever the application, integrated circuits greatly enrich overall user experience by adding desirable features that were previously unattainable.

SUMMARY

Computers, handheld electronic devices, smartwatches, appliances, vehicles, and medical equipment, among many other familiar devices, often contain some variety of integrated circuits, or chips. These chips perform a wide range of processing and control tasks, thereby making the devices that contain the chips far more appealing and useful. Processors enable the devices that contain them to execute a wide variety of applications. The applications include data processing, entertainment, messaging, patient monitoring, telephony, vehicle access, configuration and operation control, etc. Further elements are coupled to the processors that enable the processors to execute applications. The further elements typically include one or more of shared, common memories, communications channels, peripherals, and so on. In order to boost processor performance, and to take advantage of "locality" typical to application code executed by the processors, portions of the contents of the shared memories can be moved to cache memory. The cache memory, which can be local to processors, is typically smaller and faster than the common memory. The cache memory can be accessed by one, some, or all of the processors without having to access the slower common memory, thereby reducing access time and increasing processing speed. However, the use of the local copies of the data from the shared memory risks the local, cache data and the shared memory data getting out of synchronization.

In disclosed techniques, the data synchronization issues are resolved by coherency management using distributed snoop. A snoop request can include monitoring shared memory transactions such as data reads from and data writes to the shared memory. While read operations leave data contained within a cache or the shared memory unchanged, a write operation to a cache or to the shared memory can change data. As a result, the copy of the data within a cache can become "incoherent" with respect to the shared memory, either due to changes to the cache contents or changes to the shared memory. The data changes, if not monitored and corrected using coherency management techniques, result in memory access hazards. That is, new data can overwrite old data before the old data can be used, old data can be read before new data can be written, etc. Ideally, to maximize processor performance, access by the processors to the cache memory can continue while data, instructions, etc. are available within the cache. The memory accesses can be coordinated such that needed data is available for reading, new data does not overwrite data before the data can be accessed, and so on. The coordination of the memory accesses is accomplished by ordering snoop requests into a two-dimensional matrix. Snoop responses to the snoop requests are mapped into a first-in first-out mapping queue. The ordering and the mapping include a common ordering point for coherency management, thereby maintaining coherency between the shared memory and the one or more local queues.

A processor-implemented method for coherency management is disclosed comprising: accessing a plurality of processor cores, wherein the plurality of processor cores comprises a coherency domain, and wherein two or more processor cores within the plurality of processor cores generate read operations for a shared memory structure coupled to the plurality of processor cores; ordering snoop requests in a two-dimensional matrix, wherein the two-dimensional matrix is extensible along each axis of the two-dimensional matrix; mapping snoop responses to a first-in first-out (FIFO) mapping queue, wherein each snoop response corresponds to a snoop request, and wherein each processor core of the plurality of processor cores is coupled to at least one FIFO mapping queue; and completing a memory access operation, based on a comparison of the snoop requests and the snoop responses. In embodiments, the snoop requests are based on physical addresses for the shared memory structure. In embodiments, each column of the two-dimensional matrix is headed by a unique physical address corresponding to a particular snoop request. And in embodiments, an additional physical address initializes an additional column to the two-dimensional matrix when the physical address is unique.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 7 is a table showing cache maintenance operations (CMOs).

DETAILED DESCRIPTION

Figure 1:
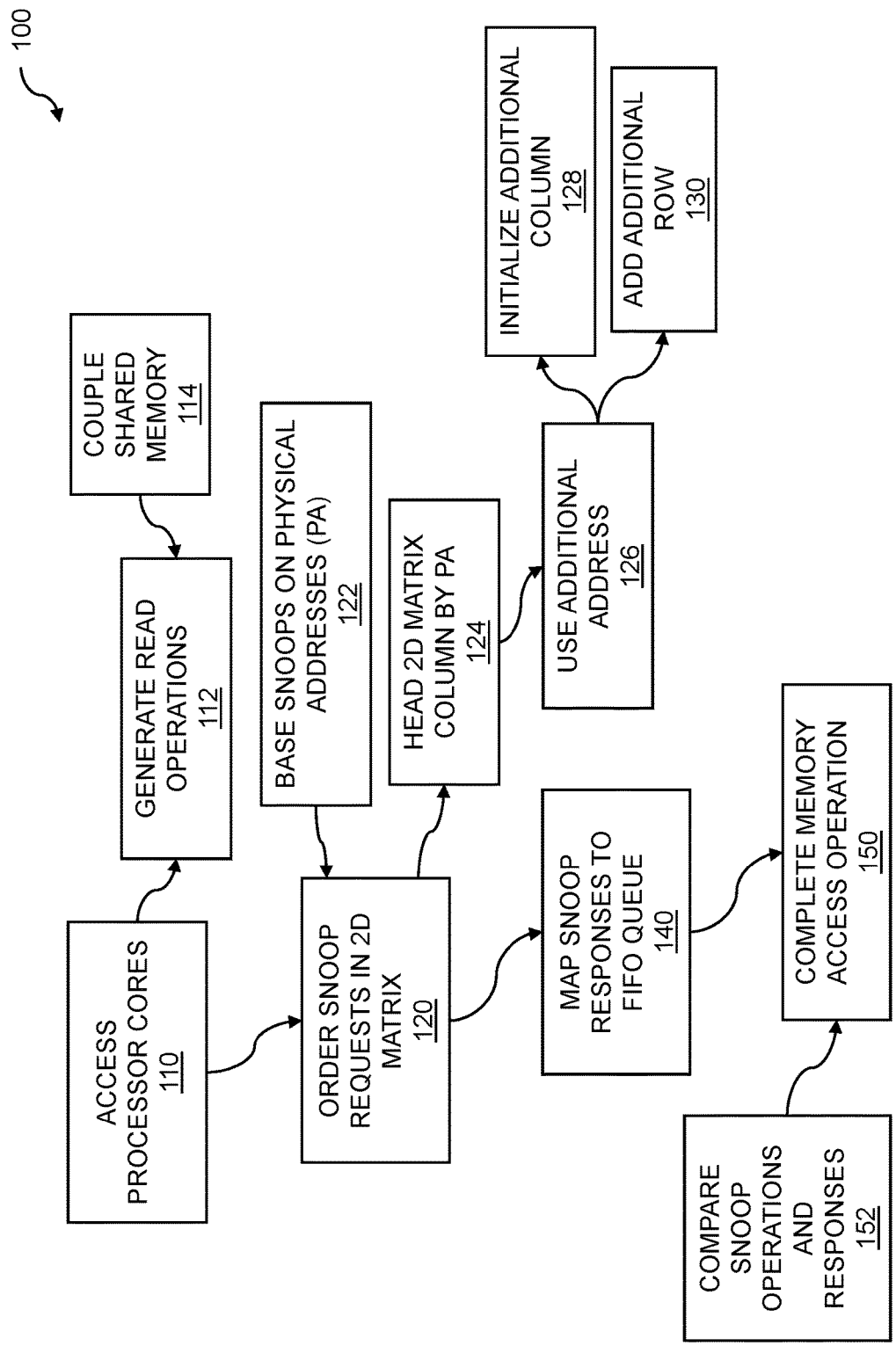
FIG. 1 is a flow diagram for coherency management using distributed snoop.

Techniques for coherency management using distributed snoop are disclosed. A processor such as a standalone processor, a processor chip, a processor core, and so on can be used to perform data processing tasks. The processing of data can be significantly enhanced by using two or more processors to process the data. The processors can be performing substantially similar operations, where the processors can process different portions or blocks of data in parallel. The processors can be performing substantially different operations, where the processors can process different blocks of data or may try to perform different operations on the same data. Whether the operations performed by the processors are substantially similar or not, managing how processors access data, and whether the data is unprocessed or processed (e.g., clean or "dirty"), is critical to successfully processing the data.

In order to increase the speed of operations such as data processing operations associated with large datasets or large numbers of similar processing jobs, a cache memory can be used to store a local or easily accessible copy of the data to be processed. A cache memory, which is typically smaller and faster than a shared, common memory, can be coupled between the common memory and the processors. As the processors process data, they search first for an address containing the data within the cache memory. If the address is not present within the cache, then a "cache miss" occurs, and the data requested by the processors can be obtained from an address within the common memory. Use of the cache memory for data access by one or more processors is preferable to accessing shared memory because of reduced latency associated with accessing the cache memory as opposed to the common memory. The accessing data within the cache is further enhanced due to the "locality of reference". That is, code, as it is being executed, tends to access a substantially similar set of memory addresses, whether the memory addresses are located in the common memory or the cache memory. By loading the contents of a set of common memory addresses into the cache, the processors are more likely to find the requested data within the cache and can obtain the requested data faster than obtaining the requested data from the common memory. Due to the smaller size of the cache with respect to the common memory, a cache miss can occur when the requested memory address is not present within the cache. One cache replacement technique that can be implemented loads a new block of data from the common memory into the cache memory, where the new block contains the requested address. Thus, processing can again continue by accessing the faster cache rather than the slower common memory.

The processors can read data from a memory such as the cache memory, process the data, then write the processed data back to the cache. As a result, the contents of the cache can be different from the contents of the common memory. To remedy this different state so that the common memory and the cache memory are "in sync", coherency management techniques can be used. A similar problem can occur when out-of-date data remains in the cache after the contents of the common memory are updated. Again, this state can be remedied using coherency management techniques. In embodiments, additional local caches can be coupled to groupings of processors. While the additional local caches can greatly increase processing speed, the additional caches further complicate coherency management. Techniques presented herein address coherency management between common memory and the caches, and coherency management among the caches based on using distributed snoop requests. The distributed snoop requests monitor memory access operations to determine whether a difference exists between data in the common memory and data in the one or more caches.

Coherency management is enabled by using coherency management with distributed snoop requests. A plurality of processor cores is accessed, wherein the plurality of processor cores comprises a coherency domain, and wherein two or more processor cores within the plurality of processor cores generate read operations for a shared memory structure coupled to the plurality of processor cores. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

FIG. 1 is a flow diagram for coherency management using distributed snoops. The coherency management can be applied to a shared memory, one or more local caches, a processor, one or more processor cores, and so on. A processor can include a multicore processor such as a RISC-V™ processor. The processor cores can include homogeneous processor cores or heterogeneous processor cores. The cores that are included can have substantially similar capabilities or substantially different capabilities. The processor cores can include further elements. The further elements can include one or more of physical memory protection (PMP) elements, memory management (MMU) elements, level 1 (L1) caches such as instruction caches and data caches, level 2 (L2) caches, and the like. The multicore processor can further include a level 3 (L3) cache, test and debug support such as Joint Test Action Group (JTAG) elements, a platform level interrupt controller (PLIC), an advanced core local interrupter (ACLINT), and so on. In addition to the elements just described, the multicore processor can include one or more interfaces. The interfaces can include one or more industry standard interfaces, interfaces specific to the multicore processor, and the like. In embodiments, the interfaces can include an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. The interfaces can enable connection between the multicore processor and an interconnect. In embodiments, the interconnect can include an AXI™ interconnect. The interconnect can enable the multicore processor to access a variety of peripherals such as storage elements, communications elements, etc.

The flow 100 includes accessing a plurality of processor cores 110. The processor cores can include homogeneous processor cores, heterogeneous processor cores, and so on. The cores can include general purpose cores, specialty cores, custom cores, and the like. In embodiments, the cores can be associated with a multicore processor such as a RISC-V™ processor. The cores can be included in one or more integrated circuits or "chips", application-specific integrated circuits (ASICs), programmable gate arrays (PGAs), and the like. In embodiments, the plurality of processor cores can include a coherency domain. The coherency domain can be used to maintain coherency between processor cores, processor cores and one or more shared memory structures, etc. In the flow 100, two or more processor cores within the plurality of processor cores generate read operations 112. The read operations can include read operations for a local cache, one or more shared caches, a shared memory, and so on. Other operations can be generated by two or more processor cores. In embodiments, the two or more processor cores within the plurality of processor cores can generate write operations, read-modify-write operations, etc.

The flow 100 includes coupling 114 a shared memory structure. The shared memory structure can include a single port memory, a multiport memory, and the like. In embodiments, the shared memory structure can include a shared cache for the plurality of processor cores. The shared cache can include a small, fast, local memory that can be shared by processor cores. The shared cache can comprise a multi-level cache, where the levels can include level 1 (L1), level 2 (L2), level 3 (L3), and so on. Each succeeding level can be larger and slower than the prior level such that L2 can be larger and slower than L1, L3 can be larger and slower than L2, and so on. In embodiments, the shared memory structure can have data regions and instruction regions (e.g., Harvard Class architecture). The data regions and instruction regions can include regions that are physically separated, logically separated, etc. The shared memory structure can be accessible to the plurality of processor cores through an interconnect or a network, a bus, an interface element, etc. The interface element can support standard processor interfaces such as an Advanced extensible Interface (AXI™) including AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 400, the interface elements can be coupled to the interconnect. The interconnect can include a bus, a network, and so on. The interconnect can include an AXI™ interconnect. In embodiments, the network can include network-on-chip functionality, where the network-on-chip functionality can include coherent network-on-chip functionality. The coherent network-on-chip can include coherency messaging (e.g., cache coherency transactions) and cache miss requests.

The flow 100 includes ordering snoop requests in a two-dimensional matrix 120. The two-dimensional matrix is extensible along each axis of the two-dimensional matrix. Snoop requests can be used to maintain coherency between one or more local caches and the shared memory structure. A snoop request can include monitoring transactions such as memory access transactions to addresses with the shared memory structure. The memory access transactions are monitored to determine if the memory contents at an address are substantially similar to or substantially different from the contents of a local cache. In the flow 100, the snoop requests are based on physical addresses 122 for the shared memory structure. The physical address can be based on an absolute address, a relative address, an offset address, etc. In the flow 100, each column of the two-dimensional matrix is headed by a unique physical address 124 corresponding to a particular snoop request. The unique physical address can include a unique physical address within the shared memory structure. The flow 100 includes using an additional address 126. The additional address can be referenced by the same processor that referenced the unique address. The additional address can include a unique address or a non-unique address. In the flow 100, an additional physical address initializes an additional column 128 to the two-dimensional matrix when the physical address is unique. The number of columns within the two-dimensional matrix can be expanded based on the number of physical addresses associated with generated read operations. In the flow 100, an additional physical address adds an additional row 130 to the two-dimensional matrix when the physical address is non-unique. The non-unique physical address can be associated with an additional snoop request. In embodiments, the non-unique physical address can match an active column header physical address. The non-unique physical address can add an additional snoop request to a list or chain of snoop requests associated with a physical address. In embodiments, the additional row can comprise the tail of a snoop chain for each column of the two-dimensional matrix. The snoop chain can include an ordered list of snoop requests. The head of the chain can be the first entry of the chain, and the tail of the chain can be the last entry of the chain.

In embodiments, snoop requests can be dispatched based on an order of one or more additional rows corresponding to the unique physical address. The order can be based on an order of execution of instructions executing on a processor core, a precedence of operations, a priority of operations, and so on. One or more responses can be generated based on the snoop requests. The flow 100 includes mapping snoop responses 140 to a first-in first-out (FIFO) mapping queue. Each snoop response corresponds to a snoop request, and each processor core of the plurality of processor cores is coupled to at least one FIFO mapping queue. The responses can include an indication of content differences among local queues and the shared memory structure. The differences, when identified, can be remedied using one or more cache maintenance operations. A FIFO can be coupled to a single processor core, shared by two or more processor cores, etc. In embodiments, there can be two FIFO mapping queues for each processor core. The FIFO mapping queues can contain substantially similar snoop responses, substantially different snoop responses, different types of snoop responses, etc.

In embodiments, one of the two FIFO mapping queues can correspond to data access snoops, and the other of the two FIFO mapping queues can correspond to instruction access snoops. The data access snoops can be submitted to the data regions of the shared memory structure and the instruction access snoops can be submitted to the instruction regions of the shared memory structure. In other embodiments, data access snoops are associated with a processor core load/store unit and instruction access snoops are associated with a processor core instruction fetch unit. In embodiments, the ordering and the mapping can include a common ordering point for coherency management. The ordering and the mapping can be used to identify what data in the shared memory structure or within which cache has been changed since data was copied to one or more caches. In embodiments, the common ordering point can include a compute coherency block coupled to the plurality of processor cores. The compute coherency block can maintain coherency among the plurality of processor cores. In embodiments, the snoop request is completed when all snoop responses have been received. Other snoop requests can include pending snoop requests. The completion of pending snoop requests can be dependent on times to access the shared memory structure, times to access one or more local caches, and so on. Completion of the pending snoop requests can further be based on interface or bus contention. In embodiments, the FIFO mapping queue can include an index of a physical address contained in a header of the two-dimensional matrix. The index can be used to access the column within the two-dimensional matrix that corresponds to the physical address. The index can be used to search for a physical address that comprises a header within the two-dimensional array. In embodiments, the index in the FIFO mapping queue can be matched to the particular header of the two-dimensional matrix. The matching can be accomplished using one or more matching, searching, or sorting techniques.

The flow 100 includes completing 150 a memory access operation. The memory access operation can access a location within the shared memory structure. In embodiments, the memory access operation can include a data load (read) from the shared memory structure. The memory access operation can further include a data store (write) to the shared memory structure. In other embodiments, the memory access operation comprises an instruction fetch from the shared memory structure. The instruction fetch can fetch one or more instructions in an instruction fetch operation. In the flow 100, the completing is based on a comparison 152 of the snoop requests and the snoop responses. The comparison of the snoop requests and the snoop responses can be used to identify which of the one or more snoop requests corresponds to one or more snoop responses. Recall that a processor can generate two or more memory access operations such as read operations. In embodiments, the comparing can select the earliest snoop request corresponding to the header of the two-dimensional matrix. The earliest snoop request can be associated with an earliest memory access operation. Selecting the earliest snoop request can be used to maintain coherency between one or more local caches and the shared memory structure. In embodiments, the completing a memory access operation is based on the earliest snoop request that was selected. Completing based on the earliest snoop request that was selected can maintain a correct order of execution of memory access operations based on code executing on a processor core.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
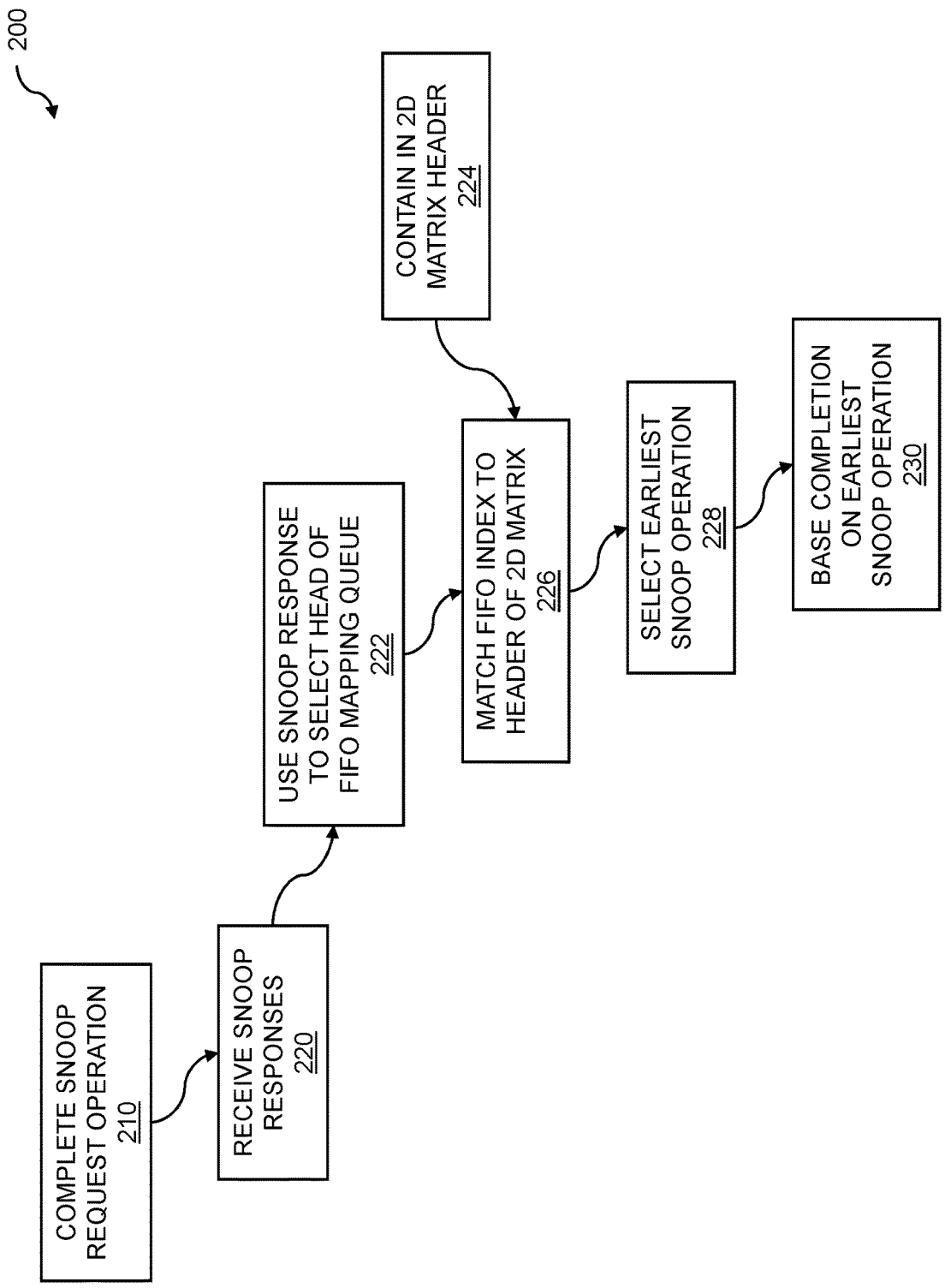
FIG. 2 is a flow diagram for snoop response handling.

FIG. 2 is a flow diagram for snoop response handling. Snoop requests and snoop responses can be used to enable coherency management between one or more local caches and a shared, common memory. The snoop requests can be performed on read operations generated by one or more processor cores. Coherency between the caches and the shared memory can be maintained using one or more cache coherency transactions. Further, the cache coherency transactions can enable coherency between the local caches coupled to processor cores. The snoop response handling enables coherency management using distributed snoop. A plurality of processor cores is accessed, wherein the plurality of processor cores comprises a coherency domain, and wherein two or more processor cores within the plurality of processor cores generate read operations for a shared memory structure coupled to the plurality of processor cores. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

The flow 200 includes completing a snoop request operation 210. A snoop request can cause operations that include checking pending accesses of cache memory, local memory, shared common memory, and so on. In embodiments, a memory access operation can be based on a comparison of snoop requests and corresponding snoop responses. The snoop requests can request information associated with changes to local cache data, other local cache data, shared memory data, and the like. The flow 200 includes receiving one or more snoop responses 220. A snoop response can be received in response to a snoop request. A snoop request can monitor memory access operations to determine whether an access operation can modify shared data at an address. Shared data can include copies of data within a structure such as a shared memory structure shared to one or more local caches. If the access operation can modify data, then the snoop request can determine whether a local copy of the shared data is the same as the modified data or different from the modified data. If different, then a coherency management operation can be performed to ensure that all copies of the shared data are coherent (i.e., substantially similar).

In embodiments, one or more snoop responses can be mapped to a first-in first-out (FIFO) mapping queue. More than one FIFO can be used, where each FIFO can be accessed based on an identifier, a value, and so on. In the flow 200, the snoop response is used to select the head of the appropriate FIFO mapping queue 222. Note that after one or more snoop requests are sent to a core (in general, the number of FIFOs per core determines how many snoop requests can be sent to that core at the same time), the corresponding snoop response indexes, or selects, the head of the correct FIFO, which provides an index into the corresponding column of the snoop request two-dimensional (2D) matrix, which contains the physical address. The physical address can include an address in the shared common memory structure or other storage structure. The index can include a pointer to the physical address. In the flow 200, the snoop requests are based on physical addresses for the shared memory structure. The physical address can include an absolute address, a relative address, an offset address, etc. The physical address is contained in a header of a two-dimensional matrix 224. Recall that snoop requests can be ordered in a two-dimensional, extensible matrix. The matrix comprises columns, where each column of the two-dimensional matrix is headed by a unique physical address corresponding to a particular snoop request. The snoop request can be associated with monitoring a physical address in the shared memory structure. In embodiments, each column of the two-dimensional matrix can be headed by a unique physical address corresponding to a particular snoop request. Snoop requests from processor cores can be ordered into matrix columns. In embodiments, an additional physical address can initialize an additional column to the two-dimensional matrix when the physical address is unique. The two-dimensional matrix is also extensible with respect to the number of matrix rows, since not all physical addresses will be unique. In embodiments, an additional physical address can add an additional row to the two-dimensional matrix when the physical address is non-unique. The row can be added to the two-dimensional matrix when the non-unique physical address matches an active column header physical address.

The flow 200 includes matching the index in the FIFO mapping queue to the particular header of the two-dimensional (2D) matrix 226. The matching can be based on a numerical matching technique, a sorting technique, and so on. The matching can determine which column within the two-dimensional matrix contains the ordered list of snoop requests. The snoop response is associated with a snoop request ordered within the matrix column. In the flow 200, the comparing selects the earliest snoop request 228 corresponding to the header of the two-dimensional matrix. Selecting the earliest snoop request can be used to maintain correct memory access ordering. The ordering can be based on executing instructions or operations on a processor, instruction priority or precedence, etc. In the flow 200, the completing is based 230 on the earliest snoop request that was selected. Note that a single snoop request in the 2D matrix may spawn multiple snoop requests to the multiple cores and their caches simultaneously. The related snoop responses must all be collected before the single snoop request at the head of a column of the 2D matrix is considered completed. Because the heads of the 2D matrix are exposed, a maximal number of snoops can be generated to the cores based on the request at each head.

As discussed later, maintaining cache coherency can be accomplished using cache maintenance operations, which can include cache block operations. A cache block can include a portion or block of common memory contents, where the block can be moved from the common memory into a local cache. In embodiments, the cache block operations can include a cache line zeroing operation, a cache line cleaning operation, a cache line flushing operation, and a cache line invalidating operation. These operations are discussed in detail below. The cache block operations can be used to maintain coherency. In embodiments, the cache line zeroing operation can include uniquely allocating a cache line at a given physical address with a zero value. The zero value can be used to overwrite and thereby clear previous data. The zero value can indicate a reset value. The cache line can be set to a nonzero value if appropriate. In embodiments, the cache line cleaning operation can include making all copies of a cache line at a given physical address consistent with that of memory. Recall that the processors can be arranged in groupings of two or more processors, and that each grouping can be coupled to a local cache. One or more of the local caches can contain a copy of the cache line. The line cleaning operation can set or make all copies of the cache line consistent with the shared memory contents. In other embodiments, the cache line flushing operation can include flushing any dirty data for a cache line at a given physical address to memory and then invalidating any and all copies. The "dirty" data can result from processing a local copy of data within a local cache. The data within the local cache can be written to the common memory to update the contents of the physical address in the common memory. In further embodiments, the cache line invalidating operation can include invalidating any and all copies of a cache line at a given physical address without flushing dirty data. Having flushed data from a local cache to update the data at a corresponding location or physical address in the common memory, all remaining copies of the old data within other local caches becomes invalid.

The cache line instructions just described can be mapped to standard operations or transactions for cache maintenance, where the standard transactions can be associated with a given processor type. In embodiments, the processor type can include a RISC-V™ processor core. The standard cache maintenance transactions can differ when transactions occur from the cores and when transactions occur to the cores. The transactions can comprise a subset of cache maintenance operations, transactions, and so on. The subset of operations can be referred to as cache block operations (CBOs). The cache block operations can be mapped to standard transactions associated with an ARM™ Advanced extensible Interface (AXI™) Coherence Extensions (ACE™) interface, an Advanced Microcontroller Bus Architecture (AMBA™) Coherence Hub Interface (CHI™), etc. In embodiments, the cache coherency transactions can be issued globally before being issued locally. A globally issued transaction can include a transaction that enables cache coherency from a core to cores globally. The issuing cache coherency transactions globally can prevent invalid data from being processed by processor cores using local, outdated copies of the data. The issuing cache coherency transactions locally can maintain coherency within compute coherency blocks (CCBs) such as groupings of processors. In embodiments, the cache coherency transactions that are issued globally can complete before cache coherency transactions are issued locally. A variety of indicators, such as a flag, a semaphore, a message, a code, and the like, can be used to signify completion. In embodiments, an indication of completeness can include a response from the coherent network-on-chip.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
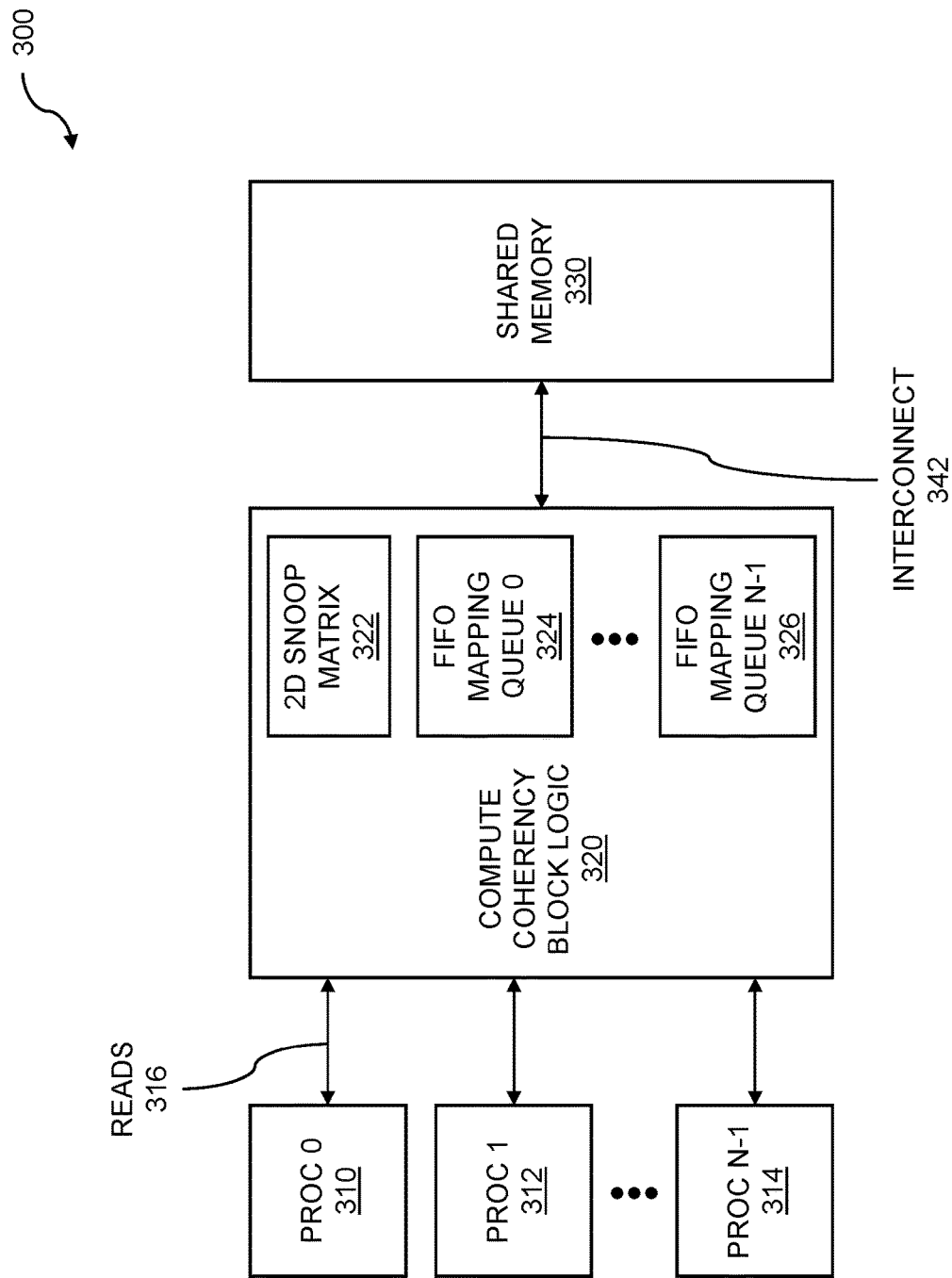
FIG. 3 is a system block diagram showing distributed snooping.

FIG. 3 is a system block diagram showing distributed snooping. One or more processors such as multicore processors can access a shared, common memory. Processor cores can be coupled to a local cache, where the local cache can be colocated with the processor cores, adjacent to the processor cores, and so on. The local cache can be loaded with data from a source such as the shared, common memory. The processors coupled to the local cache can process the data. Processing the data in the local cache can cause the data to become "dirty" or different from the contents of the shared memory. Noted throughout, processor cores and groupings of processor cores can be coupled to their own local caches, and the processor cores can make changes to local cache data. Thus, the problem of maintaining coherency between the contents of the shared memory and the local caches becomes highly complex. To resolve the coherency challenges, distributed snooping techniques can be applied to read operations generated by the processor cores. The snooping operations can order snoop requests based on a physical address to be accessed by a read operation. Reponses from the snooping operations can be mapped into a first-in first-out mapping queue, prior to submitting a memory access operation.

The system block diagram 300 includes a plurality of processors such as processor 0 310, processor 1 312, processor N–1 314, and so on. The processors can include multicore processors such as a RISC-V™ processor. The processors can generate read operations 316, where the read operations can be for a shared memory structure coupled to the plurality of processor cores. The read operations can be generated by any of the processor cores. The read operations can be captured by compute coherency block logic 320. The compute coherency block can be responsible for coherency between one or more caches such as local caches associated with the processor cores and the shared memory system. The compute coherency block can perform one or more cache maintenance operations (discussed below) such as resolving data inconsistencies due to "dirty" data in one or more caches. The dirty data can result from changes to the local copies of shared memory contents in the local caches. The changes to the local copies of data can result from processing operations performed by the processor cores as the cores execute code. Similarly, data in the shared memory can be different from the data in a local cache due to an operation such as a write operation.

In the system block diagram 300, the compute coherency block logic 320 can include a two-dimensional snoop matrix 322. The two-dimensional snoop matrix can include columns and rows and can be extensible. Recall that in embodiments, the snoop requests can be based on physical addresses for the shared memory structure. The physical addresses can include absolute, relative, offset, etc. addresses in the shared memory structure. In embodiments, each column of the two-dimensional matrix can be headed by a unique physical address corresponding to a particular snoop request. The physical address can correspond to one or more read operations generated by one or more processors within the plurality of processor cores. In embodiments, an additional physical address can initialize an additional column to the two-dimensional matrix when the physical address is unique. The additional physical address can include a unique physical address within a cluster of addresses to be accessed by the plurality of processors. In other embodiments, an additional physical address can add an additional row to the two-dimensional matrix when the physical address is non-unique. The adding the row indicates that an additional read operation has been generated by processor core. A column within the two-dimensional matrix can comprise a "snoop chain", where the snoop chain can include a head or first snoop and a tail snoop. In embodiments, the additional row can comprise the tail of a snoop chain for each column of the two-dimensional matrix.

The system block diagram 300 can include one or more first-in first-out (FIFO) mapping queues such as FIFO mapping queue 0 324, FIFO mapping queue N–1 326, and so on. In embodiments, snoop responses are mapped to a first-in first-out (FIFO) mapping queue. The snoop responses can correspond to snoop requests, where the snoop requests can be based on physical addresses for the shared memory structure. In embodiments, each processor core of the plurality of processor cores can be coupled to at least one FIFO mapping queue. The coupling to more than one FIFO can be associated with snoop requests, where the snoop requests can include snoop requests associated with a plurality of physical addresses. The physical addresses can include physical addresses within a shared memory structure. The system block diagram 300 can include a shared memory structure 330. The shared memory structure can include memory colocated with the processor cores, adjacent to the processor cores, and so on. In embodiments, the processor cores can access the shared memory structure through an interconnect 342. The interconnect can include a bus, a network, and so on.

Figure 4:
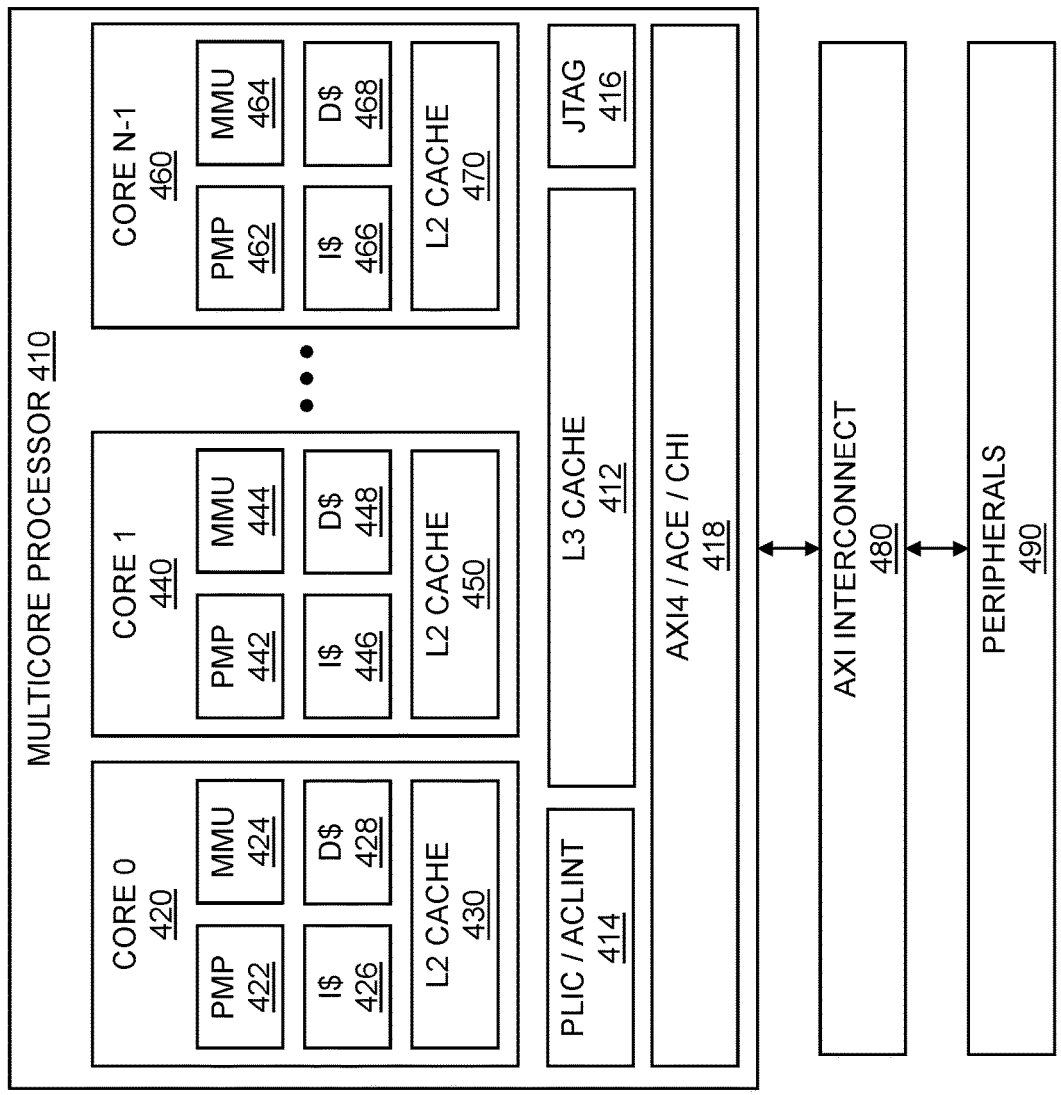
FIG. 4 is a block diagram illustrating a RISC-V processor.

FIG. 4 is a block diagram illustrating a RISC-V™ processor. The processor can include a multi-core processor, where two or more processor cores can be associated with the processor. The processor, such as a RISC-V™ processor, can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by coherency management using distributed snoop. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

The block diagram 400 can include a multicore processor 410. The multicore processor can comprise two or more processors, where the two or more processors can include homogeneous processors, heterogeneous processors, etc. In the block diagram, the multicore processor can include N processor cores such as core 0 420, core 1 440, core N−1 460, and so on. Each processor can comprise one or more elements. In embodiments, each core, including cores 0 through core N−1, can include a physical memory protection (PMP) element, such as PMP 422 for core 0; PMP 442 for core 1, and PMP 462 for core N−1. In a processor architecture such as the RISC-V™ architecture, a PMP can enable processor firmware to specify one or more regions of physical memory such as cache memory of the shared memory, and to control permissions to access the regions of physical memory. The cores can include a memory management unit (MMU) such as MMU 424 for core 0, MMU 444 for core 1, and MMU 464 for core N−1. The memory management units can translate virtual addresses used by software running on the cores to physical memory addresses with caches, the share memory system, etc.

The processor cores associated with the multicore processor 410 can include caches such as instruction caches and data caches. The caches, which can comprise level 1 (L1) caches, can include an amount of storage such as 16 KB, 32 KB, and so on. The caches can include an instruction cache I$ 426 and a data cache D$ 428 associated with core 0; an instruction cache I$ 446 and a data cache D$ 448 associated with core 1; and an instruction cache I$ 466 and a data cache D$ 468 associated with core N−1. In addition to the level 1 instruction and data caches, each core can include a level 2 (L2) cache. The level 2 caches can include L2 cache 430 associated with core 0; L2 cache 450 associated with core 1; and L2 cache 470 associated with core N−1. The cores associated with the multicore processor 410 can include further components or elements. The further elements can include a level 3 (L3) cache 412. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 414. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 416. The JTAG can provide a boundary within the cores of the multicore processor. The JTAG can enable fault information to a high precision. The high-precision fault information can be critical to rapid fault detection and repair.

The multicore processor 410 can include one or more interface elements 418. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 400, the interface elements can be coupled to the interconnect. The interconnect can include a bus, a network, and so on. The interconnect can include an AXI™ interconnect 480. In embodiments, the network can include network-on-chip functionality. The AXI™ interconnect can be used to connect memory-mapped "master" or boss devices to one or more "slave" or worker devices. In the block diagram 400, the AXI interconnect can provide connectivity between the multicore processor 410 and one or more peripherals 490. The one or more peripherals can include storage devices, networking devices, and so on. The peripherals can enable communication using the AXI™ interconnect by supporting standards such as AMBA™ version 4, among other standards.

Figure 5:
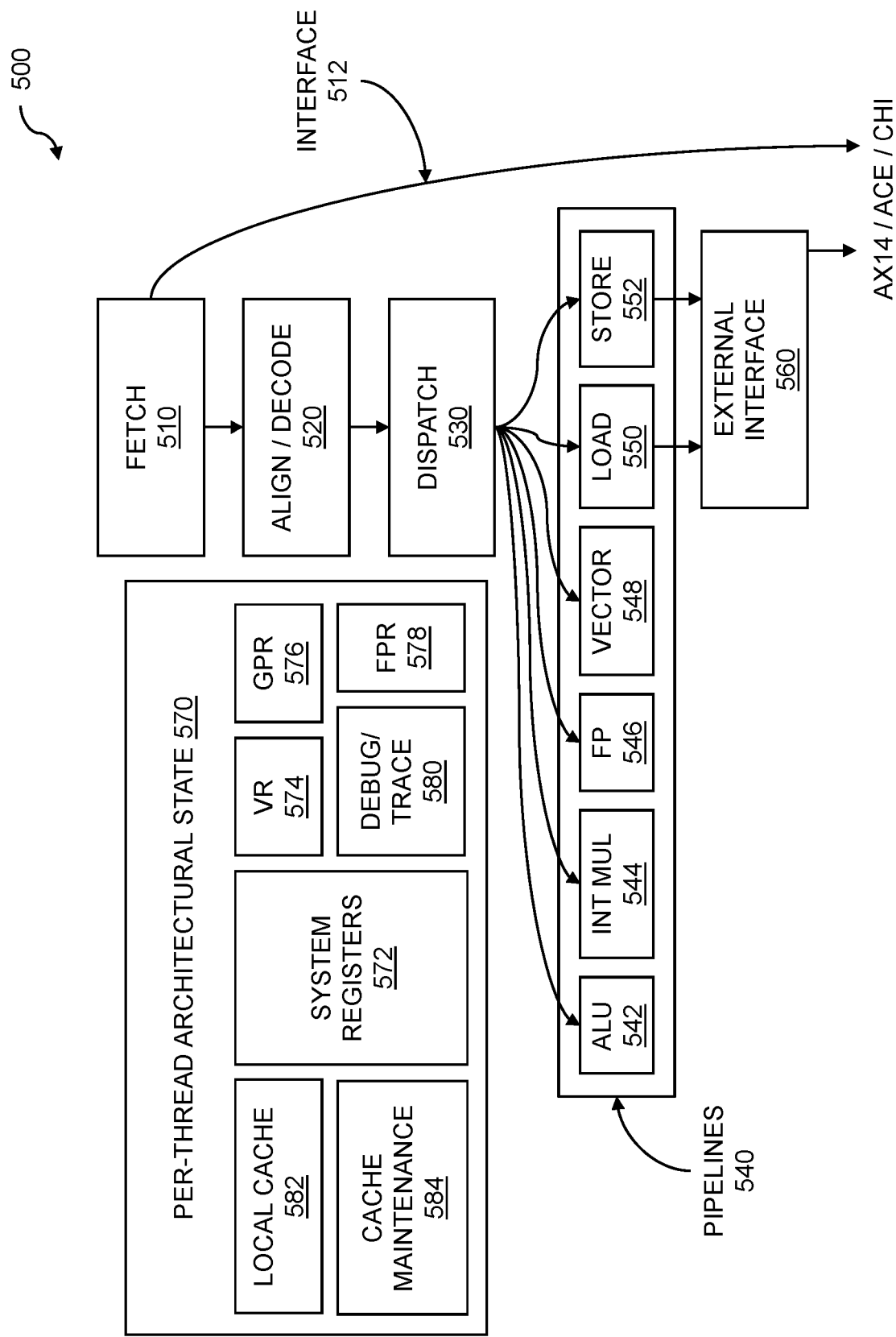
FIG. 5 is a block diagram for a pipeline.

FIG. 5 is a block diagram for a pipeline. The use of one or more pipelines associated with a processor architecture can greatly enhance processing throughput. The processor architecture can be associated with one or more processor cores. The processing throughput can be increased because multiple operations can be executed in parallel. The use of one or more pipelines supports coherency management using distributed snoop. A plurality of processor cores is accessed, wherein the plurality of processor cores comprises a coherency domain, and wherein two or more processor cores within the plurality of processor cores generate read operations for a shared memory structure coupled to the plurality of processor cores. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

The FIG. 500 shows a block diagram of a pipeline such as a processor core pipeline. The blocks within the block diagram can be configurable in order to provide varying processing levels. The varying processing levels can be based on processing speed, bit lengths, and so on. The block diagram 500 can include a fetch block 510. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 512. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 500 includes an align and decode block 520. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 500 can include a dispatch block 530. The dispatch block can receive decoded instruction packets from the align and decode block. The decode instruction packets can be used to control a pipeline 540, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 542, integer multiplier pipelines 544, floating-point unit (FPU) pipelines 546, vector unit (VU) pipelines 548, and so on. The dispatch unit can further dispatch instructions to pipes that can include load pipelines 550, and store pipelines 552. The load pipelines and the store pipelines can access storage such as the common memory using an external interface 560. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 570. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 572. The system registers can be associated with individual processors, a system comprising multiple processors, and so on. The system registers can include exception and interrupt components, counters, etc. The per-thread architectural state can include further registers such as vector registers (VR) 574, general purpose registers (GPR) 576, and floating-point registers 578. These registers can be used for vector operations, general purpose (e.g., integer) operations, and floating-point operations, respectively. The per-thread architectural state can include a debug and trace block 580. The debug and trace block can enable debug and trace operations to support code development, troubleshooting, and so on. In embodiments, an external debugger can communicate with a processor through a debugging interface such as a joint test action group (JTAG) interface. The per-thread architectural state can include a local cache state 582. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 584. The cache maintenance state can include maintenance needed, maintenance pending, and maintenance complete states, etc.

Figure 6:
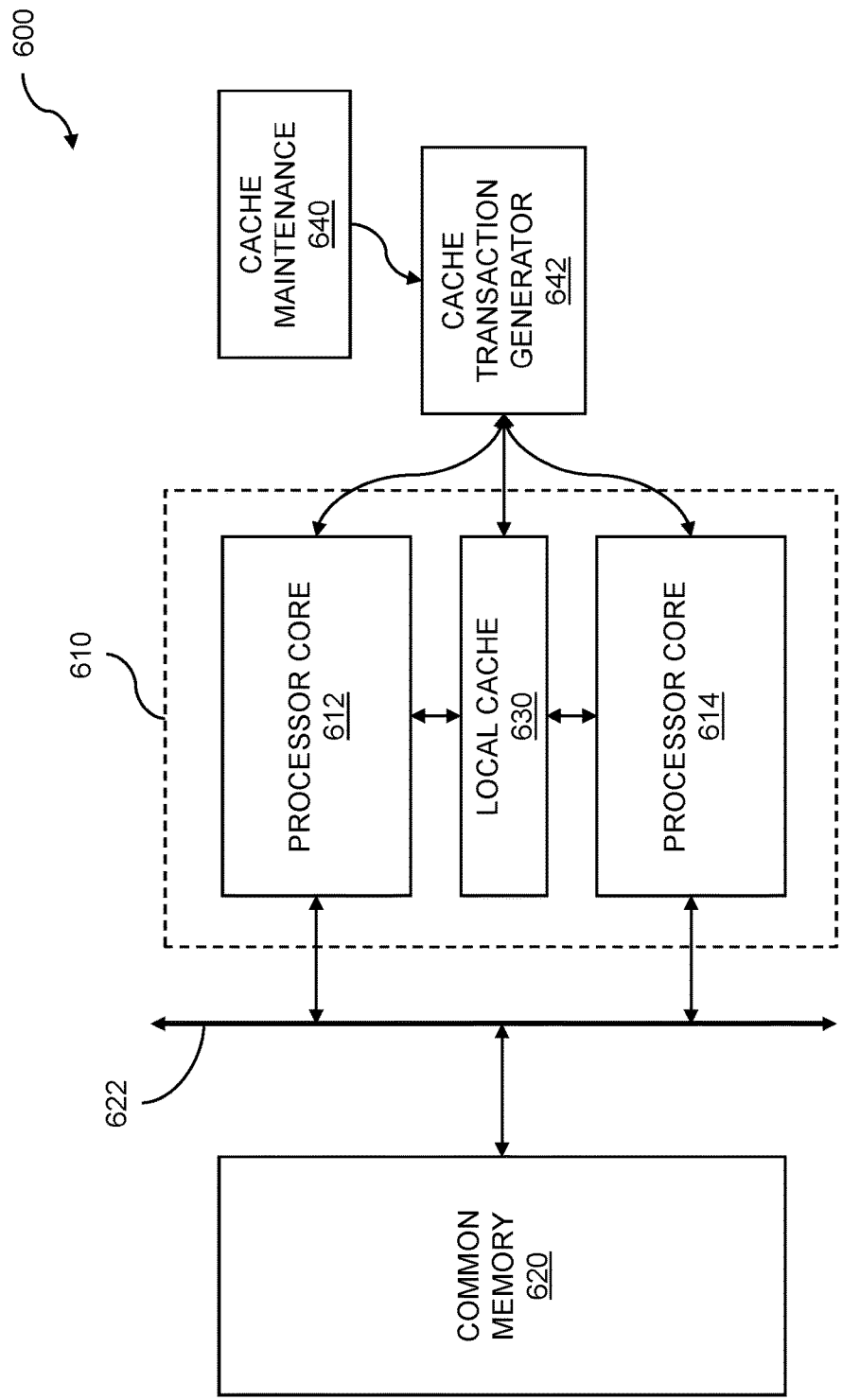
FIG. 6 is a system block diagram illustrating processor cores with coherency management.

FIG. 6 is a system block diagram illustrating processor cores with coherency management. Described previously and throughout, processor cores can be coupled to a local cache. The processor cores can be arranged into groupings of two or more processor cores. The local cache can be loaded with data from a source such as a shared memory. The processor cores coupled to the local cache can process the data, causing the data to become "dirty" or different from the contents of the shared memory. Since multiple groupings of processor cores can each be coupled to their own local caches, the problem of incoherency between the contents of the shared memory and the local caches becomes highly complex. To resolve the coherency challenges, one or more coherency management operations can be applied to the data within the local caches and the shared memory. An operation such as a "snoop" operation can examine shared memory and cache access operations so that the access operations can be ordered and storage access hazards can be avoided. Memory access hazards can include write before read, read before write, and so on. The coherency management operations enable coherency management using distributed snoop. A plurality of processor cores is accessed, wherein the plurality of processor cores comprises a coherency domain, and wherein two or more processor cores within the plurality of processor cores generate read operations for a shared memory structure coupled to the plurality of processor cores. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

A system block diagram 600 of processor cores with coherency management is shown. A multicore processor 610 can include a plurality of processor cores. The processor cores can include homogeneous processor cores, heterogeneous cores, and so on. In the system block diagram 600, two processor cores are shown, processor core 612 and processor core 614. The processor cores can be coupled to a common memory 620. The common memory can be shared by a plurality of multicore processors. The common memory can be coupled to the plurality of processor cores through a coherent network-on-chip 622. The network-on-chip can be colocated with the plurality of processor cores within an integrated circuit or chip, an application-specific integrated circuit (ASIC), a field programmable gate array (FPGA), and so on. The network-on-chip can be used to interconnect the plurality of processor cores and other elements within a system-on-chip (SoC) architecture. The network-on-chip can support coherency between the common memory 620 and one or more local caches (described below) using coherency transactions. In embodiments, the cache coherency transactions can enable coherency among the plurality of processor cores, one or more local caches, and the memory. The cache coherency can be accomplished based on coherency messages, cache misses, and the like.

The system block diagram 600 can include a local cache 630. The local cache can be coupled to a grouping of two or more processor cores within a plurality of processor cores. The local cache can include a multilevel cache. In embodiments, the local cache can be shared among the two or more processor cores. The cache can include a multiport cache. In embodiments, the grouping of two or more processor cores and the shared local cache can operate using local coherency. The local coherency can indicate to processors associated with a grouping of processors that the contents of the cache have been changed or made "dirty" by one or more processors within the grouping. In embodiments, the local coherency is distinct from the global coherency. That is, the coherency maintained for the local cache can be distinct from coherency between the local cache and the common memory, coherency between the local cache and one or more further local caches, etc.

The system block diagram 600 can include a cache maintenance element 640. The cache maintenance element can maintain local coherency of the local cache, coherency between the local cache and the common memory, coherency among local caches, and so on. The cache maintenance can be based on issuing cache transactions. In the system block diagram 600, the cache transaction can be provided by a cache transaction generator 642. In embodiments, the cache coherency transactions can enable coherency among the plurality of processor cores, one or more local caches, and the memory. The contents of the caches can become "dirty" by being changed. The cache contents changes can be accomplished by one or more processors processing data within the caches, by changes made to the contents of the common memory, and so on. In embodiments, the cache coherency transactions can be issued globally before being issued locally. Issuing the cache coherency transactions globally can ensure that the contents of the local caches are coherent with respect to the common memory. Issuing the cache coherency transactions locally can ensure coherency with respect to the plurality of processors within a given grouping. In embodiments, the cache coherency transactions that are issued globally can complete before cache coherency transactions are issued locally. The completion of the coherency transaction issued globally can include a response from the coherent network-on-chip.

FIG. 7 is a table showing cache maintenance operations (CMOs) 700. Coherency management between a common memory shared by processors or processor cores, and local caches associated with the processor cores, must be maintained in order to support effective processing. In embodiments, the local caches can be associated with groupings of two or more processors. While the use of multiple local caches can greatly increase overall processing efficiency of applications such as parallel processing applications, the efficacy and efficiency of the application processing fails if the data that is being processed is "stale" or "dirty". The application processing further fails if new data is written over data before the latter data can be processed, and so on. The use of multiple local caches can reduce shared memory access contention, as well as access contention to a single cache. Supporting the multiple local caches greatly complicates storage coherency because multiple copies of the same data can be loaded into multiple caches. The processor cores that access the data in the local caches can change the local copies of the data. Cache maintenance operations enable coherency management using distributed snoop. A plurality of processor cores is accessed, wherein the plurality of processor cores comprises a coherency domain, and wherein two or more processor cores within the plurality of processor cores generate read operations for a shared memory structure coupled to the plurality of processor cores. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

In embodiments, the cache maintenance operations (CMOs) 710 can be supported by the processor architecture such as a RISC-V™ architecture. The operations can include privileged instructions in order to access the common memory, the local caches, and so on. A subset of the cache maintenance operations can include cache block operations (CBOs). The cache block operations can accomplish a variety of data handling operations such as setting a state of all local caches into a particular state with respect to the common memory. The CBO operations can be applied to caches such as local caches within a coherency domain. The coherency domain can include the common memory, the local caches associated with groupings of processors, and so on. In order for the CBO operations to be performed within the coherency domain, the CBO operations can be mapped to standardized cache transactions. The standardized cache transactions can be associated with a processor type, an industry standard, and so on. In embodiments, standardized transactions can include cache maintenance operations supporting cache transactions such as ARM™ Advanced extensible Interface (AXI™) Coherence Extensions (ACE™) cache transactions, Advanced Microcontroller Bus Architecture (AMBA™) Coherence Hub Interface (CHI™) transactions, etc. The mappings of the CBOs can be different for transactions originating from cores or caches to cores globally, and to cores and caches locally in a compute coherency block (CCB). In embodiments, the cache coherency transactions can be issued globally before being issued locally. The issuing globally before issuing locally can accomplish saving new data to the common memory and sharing the new data to the other local caches. In embodiments, the cache coherency transactions that are issued globally can complete before cache coherency transactions are issued locally.

The cache maintenance operations can include a cache block operation cbo.zero. The operation cbo.zero can be mapped to an ACE or CHI transaction 712 from a core to cores globally, to cores locally, and so on. In embodiments, the cache coherency transactions can include issuing a Make_Unique operation globally and a Read_Unique operation locally, based on a cache maintenance operation of cache line zeroing. The cache maintenance operations can include a cache block operation cbo.clean. The operation cbo.clean can be mapped to an ACE or CHI transaction 714 from a core to cores globally, to cores locally, and the like. In embodiments, the cache coherency transactions can include issuing a Clean_Shared operation globally and a Read_Shared operation locally, based on a cache maintenance operation of cache line cleaning. The cache maintenance operations can include a cache block operation cbo.flush. The operation cbo.flush can be mapped to an ACE or CHI transaction from a core to cores globally, to cores locally, etc. In embodiments, the cache coherency transactions can include issuing a Clean_Invalid operation globally and a Read_Unique operation locally, based on a cache maintenance operation of cache line flushing. The cache maintenance operations can further include a cache block operation cbo.inval (i.e., invalid). The operation cbo.inval can also be mapped to an ACE or CHI transaction from a core to cores globally, to cores locally, and so on. In embodiments, the cache coherency transactions can include issuing a Make_Invalid operation globally and a Read_Unique operation locally, based on a cache maintenance operation of cache line invalidating.

In embodiments, the cache maintenance operation can include cache block operations. The cache block operation can include moving data such as a block of data, replacing data, clearing data, and so on. In embodiments, the cache block operations can include a cache line zeroing operation, a cache line cleaning operation, a cache line flushing operation, and a cache line invalidating operation. The cache block operations can be executed for one or more local caches. In embodiments, the cache line zeroing operation can include uniquely allocating a cache line at a given physical address with zero value. Setting a cache line to a specific value such as zero can accomplish a reset, indicate that no data is available, set the cache line to a known value rather than leaving the cache line in an unknown state, etc. In embodiments, the cache line cleaning operation can include making all copies of a cache line at a given physical address consistent with that of memory. Recall that local caches can each be associated with a grouping of processors. Cleaning all cache lines at a given address ensures that the processor groupings can execute operations on consistent data. In embodiments, the cache line flushing operation can include flushing any dirty data for a cache line at a given physical address to memory and then invalidating any and all copies. The cache line data can become stale or "dirty" as a result of the data within the cache line being updated by operations executed by processors associated with the cache line. Flushing the dirty data to the common memory can change the contents of the common memory, and by doing so, can invalidate copies of the un-updated cache line data within the other cache lines. In embodiments, the cache line invalidating operation comprises invalidating any and all copies of a cache line at a given physical address without flushing dirty data. The cache line invalidating can result from a branch decision, an exception, and the like.

Figure 8:
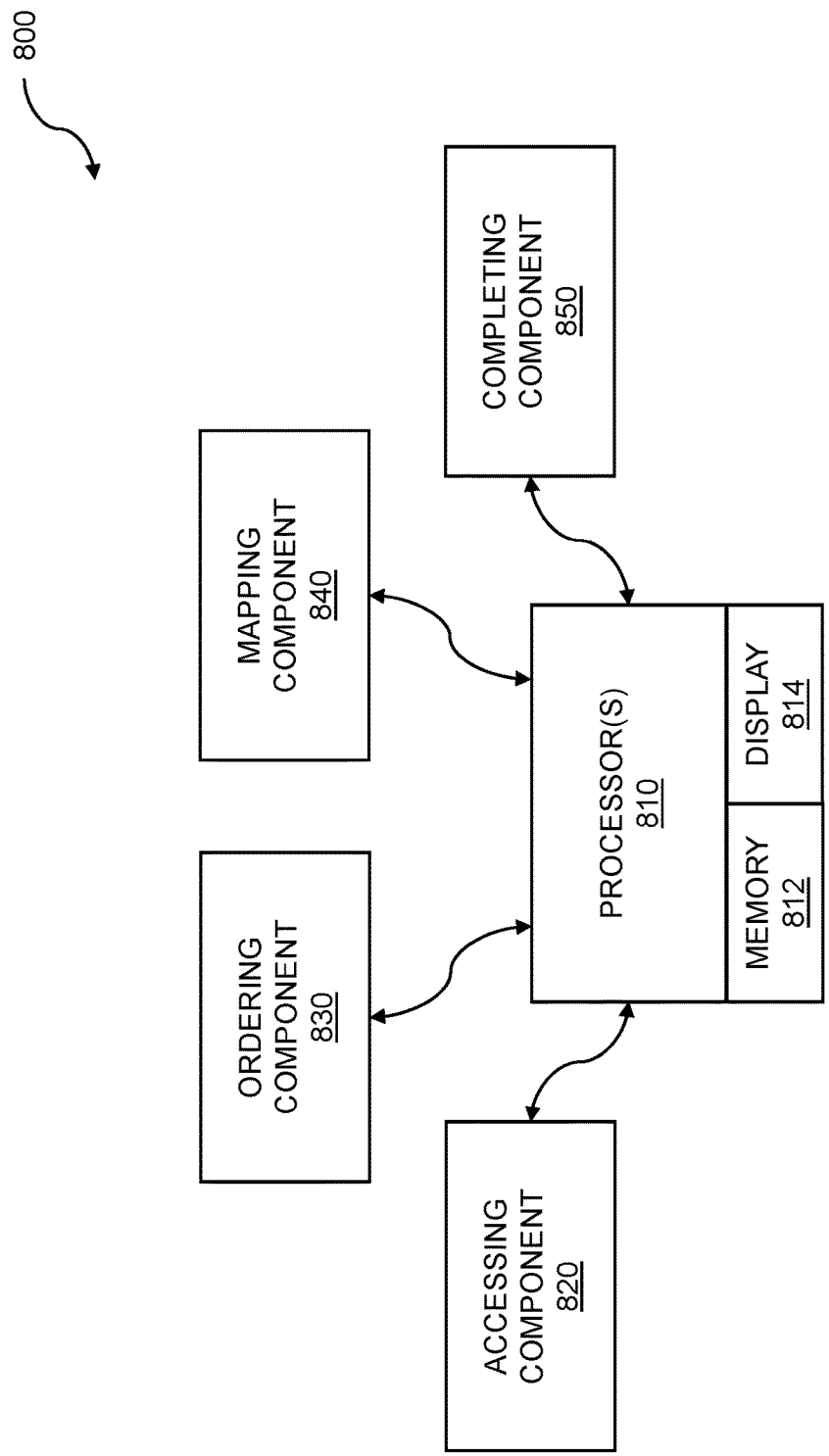
FIG. 8 is a system diagram for coherency management using distributed snoop.

FIG. 8 is a system diagram for coherency management, where the coherency management is enabled by coherency management using distributed snoop. The system can comprise an apparatus for coherency management. The apparatus can be based on semiconductor logic. The system can include one or more of processors, memories, cache memories, displays, and so on. The system 800 can include one or more processors 810. The processors can include standalone processors within integrated circuits or chips, processor cores in FPGAs or ASICs, and so on. The one or more processors 810 are coupled to a memory 812, which stores operations. The memory can include one or more of local memory, cache memory, system memory, etc. The system 800 can further include a display 814 coupled to the one or more processors 810. The display 814 can be used for displaying data, instructions, operations, snoop requests, snoop responses, and the like. The operations can include operations such as Advanced extensible Interface (AXI) Coherence Extensions (ACE) cache transactions, Advanced Microcontroller Bus Architecture (AMBA™) Coherence Hub Interface (CHI™) transactions, etc.

In embodiments, one or more processors 810 are coupled to the memory 812, wherein the one or more processors, when executing the instructions which are stored, are configured to: access a plurality of processor cores, wherein the plurality of processor cores comprises a coherency domain, and wherein two or more processor cores within the plurality of processor cores generate read operations for a shared memory structure coupled to the plurality of processor cores; order snoop requests in a two-dimensional matrix, wherein the two-dimensional matrix is extensible along each axis of the two-dimensional matrix; map snoop responses to a first-in first-out (FIFO) mapping queue, wherein each snoop response corresponds to a snoop request, and wherein each processor core of the plurality of processor cores is coupled to at least one FIFO mapping queue; and complete a memory access operation, based on a comparison of the snoop requests and the snoop responses.

The system 800 can include an accessing component 820. The accessing component 820 can access a plurality of processor cores. The processor cores can be accessed within one or more chips, FPGAs, ASICs, etc. In embodiments, the processor cores can include RISC-V™ processor cores. In embodiments, the plurality of processor cores comprises a coherency domain. The coherency can include coherency between the shared memory and cache memory, such as level 1 (L1) cache memory. L1 cache memory can include a local cache coupled to groupings of two or more processor cores. The coherency between the shared memory and one or more local cache memories can be accomplished using cache maintenance operations (CMOs), described previously. In embodiments, two or more processor cores within the plurality of processor cores generate read operations for a shared memory structure coupled to the plurality of processor cores. The read operations for the shared memory can result based on cache misses to local cache, thereby requiring the read operations to be generated for the shared memory. In embodiments, each processor of the plurality of processor cores accesses a common memory through a coherent network-on-chip. The common memory can include on-chip memory, off-chip memory, etc. The coherent network-on-chip comprises a global coherency.

The system 800 can include an ordering component 830. The ordering component 830 can order snoop requests in a two-dimensional matrix. A snoop request can include monitoring one or more physical addresses for changes in the shared data at the physical addresses. When changes are detected, the shared data changes can be propagated to all copies of the shared data, where the shared copies can be stored in one or more local caches. In embodiments, the two-dimensional matrix is extensible along each axis of the two-dimensional matrix. The two-dimensional matrix can be expanded based a number of physical addresses within the shared memory that can be accessed by the two or more processor cores and by the number of snoop requests requiring access to each physical address. In embodiments, the two-dimensional matrix can be headed by a unique physical address corresponding to a particular snoop request. The unique physical address can be a full address, an indirect address, a relative address, and so on. In embodiments, an additional physical address can initialize an additional column to the two-dimensional matrix when the physical address is unique. The number of columns associated with the two-dimensional matrix can be expanded or contracted depending on the number of unique addresses used to access the shared memory. In other embodiments, an additional physical address can add an additional row to the two-dimensional matrix when the physical address is non-unique. In a usage example, a processor core generates a shared memory access request. The request includes a physical address. If the physical address is unique, then a new column within the two-dimensional matrix is created. If the physical address is not unique, that is the access request corresponds to a physical address already represented within the two-dimensional matrix, then a new row is created within the matrix. In embodiments, the non-unique physical address can match an active column header physical address.

The system 800 can include a mapping component 840. The mapping component 840 can map snoop responses to a first-in first-out (FIFO) mapping queue. In embodiments, each snoop response can correspond to a snoop request. A snoop response can include data unchanged, data changed, data change pending, and so on. In embodiments, each processor core of the plurality of processor cores is coupled to at least one FIFO mapping queue. A FIFO mapping queue can queue snoop responses in the order the snoop requests were issued. In embodiments, there can be two FIFO mapping queues for each processor core. The FIFO mapping queues can include elements within a processor core, can be coupled to the processor core, etc. Each of the two FIFO mapping queues can hold substantially similar data or substantially different data. In embodiments, one of the two FIFO mapping queues can correspond to data access snoops and the other of the two FIFO mapping queues can correspond to instruction access snoops. The shared memory can include memory that can store data and instructions. In embodiments, the shared memory structure can have data regions and instruction regions. The data regions and the instruction regions can be physically partitioned (e.g., Harvard architecture), logically partitioned, etc. In embodiments, the FIFO mapping queue can include an index of a physical address contained in a header of the two-dimensional matrix. The index of the physical address can include a relative address, an offset, etc. In other embodiments, the index in the FIFO mapping queue can be matched to the particular header of the two-dimensional matrix. The matching can be used to match a result of a snoop request (e.g., a snoop response) to a snoop request.

A cache maintenance operation can be performed to maintain cache coherency. The cache coherency maintenance can be applied to a shared local cache coupled to two or more processor cores, one or more local caches and the shared memory, and so on. Various cache maintenance operations (CMOs) can be performed. The cache maintenance operations can include a subset of operations such as cache block operations (CBOs). The cache block operations can update a state associated with all caches such as the local L1 caches. The updated state can include a specific state with respect to the shared memory. In embodiments, the cache block operations can include zeroing a cache line; making all copies of a cache line consistent with a cache line from the shared memory while leaving the consistent copies in the local caches; flushing "dirty" data for a cache line then invalidating copies of the flushed, dirty data; and invalidating copies of a cache line without flushing dirty data to the shared memory. The cache maintenance operation generates cache coherency transactions between the global coherency and the local coherency. Maintaining the local cache coherency and the global coherency is complicated by the use of a plurality of local caches. Recall that a local cache can be coupled to a grouping of two or more processors. While the plurality of local caches can enhance operation processing by the groupings of processors, there can be more than one dirty copy of one or more cache lines present in any given local cache. Thus, the maintaining of the coherency of the contents of the caches and the system memory can be carefully orchestrated to ensure that valid data is not overwritten, stale data is not used, etc. The cache maintenance operations can be enabled by an interconnect. In embodiments, the grouping of two or more processor cores and the shared local cache can be interconnected to the grouping of two or more additional processor cores and the shared additional local cache using the coherent network-on-chip. In embodiments, the system 800 performs coherency management through implementation of semiconductor logic. One or more processors can execute instructions which are stored to generate semiconductor logic to: access a plurality of processor cores, wherein each processor of the plurality of processor cores accesses a common memory through a coherent network-on-chip, and wherein the coherent network-on-chip comprises a global coherency; couple a local cache to a grouping of two or more processor cores of the plurality of processor cores, wherein the local cache is shared among the two or more processor cores, wherein the grouping of two or more processor cores and the shared local cache operates using local coherency, and wherein the local coherency is distinct from the global coherency; and perform a cache maintenance operation in the grouping of two or more processor cores and the shared local cache, wherein the cache maintenance operation generates cache coherency transactions between the global coherency and the local coherency.

The system 800 can include a completing component 850. The completing component 850 can complete a memory access operation, based on a comparison of the snoop requests and the snoop responses. A snoop request can be sent to determine whether data changes to contents of the shared memory have occurred. A snoop response can be mapped to a FIFO coupled to a processor core. The FIFO mapping queue can be matched to the particular header of the two-dimensional matrix, where the two-dimensional matrix can contain ordered snoop requests. In embodiments, the comparing can select the earliest snoop request corresponding to the header of the two-dimensional matrix. The earliest snoop request can be based on a first-in first-out, priority or precedence, order based on code executing on the one or more processor cores, etc. In embodiments, the completing can be based on the earliest snoop request that was selected. In other embodiments the ordering and the mapping can include a common ordering point for coherency management. The common ordering point can enable coherency management between a local cache and processor cores coupled to the local cache, between local caches; between local caches and the shared memory; and the like. In further embodiments, the common ordering point can include a compute coherency block coupled to the plurality of processor cores. The compute coherency block can be colocated with the processor cores within an integrated circuit, located within one or more further integrated circuits, etc.

The system 800 can include a computer program product embodied in a non-transitory computer readable medium for coherency management, the computer program product comprising code which causes one or more processors to generate semiconductor logic for: accessing a plurality of processor cores, wherein the plurality of processor cores comprises a coherency domain, and wherein two or more processor cores within the plurality of processor cores generate read operations for a shared memory structure coupled to the plurality of processor cores; ordering snoop requests in a two-dimensional matrix, wherein the two-dimensional matrix is extensible along each axis of the two-dimensional matrix; mapping snoop responses to a first-in first-out (FIFO) mapping queue, wherein each snoop response corresponds to a snoop request, and wherein each processor core of the plurality of processor cores is coupled to at least one FIFO mapping queue; and completing a memory access operation, based on a comparison of the snoop requests and the snoop responses.

Further embodiments include an apparatus for coherency management comprising: a plurality of processor cores operating in a coherency domain, wherein the plurality of processor cores are used to perform operations comprising: accessing a plurality of processor cores, wherein two or more processor cores within the plurality of processor cores generate read operations for a shared memory structure coupled to the plurality of processor cores; ordering snoop requests in a two-dimensional matrix, wherein the two-dimensional matrix is extensible along each axis of the two-dimensional matrix; mapping snoop responses to a first-in first-out (FIFO) mapping queue, wherein each snoop response corresponds to a snoop request, and wherein each processor core of the plurality of processor cores is coupled to at least one FIFO mapping queue; and completing a memory access operation, based on a comparison of the snoop requests and the snoop responses.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for coherency management comprising:
    accessing a plurality of processor cores, wherein the plurality of processor cores comprises a coherency domain, and wherein two or more processor cores within the plurality of processor cores generate read operations for a shared memory structure coupled to the plurality of processor cores;
    ordering snoop requests in a two-dimensional matrix, wherein the two-dimensional matrix is extensible along each axis of the two-dimensional matrix;
    mapping snoop responses to a first-in first-out (FIFO) mapping queue, wherein each snoop response corresponds to a snoop request, and wherein each processor core of the plurality of processor cores is coupled to at least one FIFO mapping queue; and
    completing a memory access operation, based on a comparison of the snoop requests and the snoop responses.

2. The method of claim 1 wherein the snoop requests are based on physical addresses for the shared memory structure.

3. The method of claim 2 wherein each column of the two-dimensional matrix is headed by a unique physical address corresponding to a particular snoop request.

4. The method of claim 3 wherein an additional physical address initializes an additional column to the two-dimensional matrix when the physical address is unique.

5. The method of claim 3 wherein an additional physical address adds an additional row to the two-dimensional matrix when the physical address is non-unique.

6. The method of claim 5 wherein the non-unique physical address matches an active column header physical address.

7. The method of claim 5 wherein the additional row comprises the tail of a snoop chain for each column of the two-dimensional matrix.

8. The method of claim 5 wherein snoop requests are dispatched based on an order of one or more additional rows corresponding to the unique physical address.

9. The method of claim 1 wherein the shared memory structure has data regions and instruction regions.

10. The method of claim 9 wherein there are two FIFO mapping queues for each processor core.

11. The method of claim 10 wherein one of the two FIFO mapping queues corresponds to data access snoops and the other of the two FIFO mapping queues corresponds to instruction access snoops.

12. The method of claim 11 wherein data access snoops are associated with a processor core load/store unit and instruction access snoops are associated with a processor core instruction fetch unit.

13. The method of claim 1 wherein the memory access operation comprises a data load from the shared memory structure.

14. The method of claim 1 wherein the memory access operation comprises an instruction fetch from the shared memory structure.

15. The method of claim 1 wherein the shared memory structure comprises a shared cache for the plurality of processor cores.

16. The method of claim 1 wherein the snoop request is completed when all snoop responses have been received.

17. The method of claim 1 wherein the FIFO mapping queue comprises an index of a physical address contained in a header of the two-dimensional matrix.

18. The method of claim 17 wherein the index in the FIFO mapping queue is matched to the header of the two-dimensional matrix.

19. The method of claim 18 wherein the comparing selects the earliest snoop request corresponding to the header of the two-dimensional matrix.

20. The method of claim 19 wherein the completing is based on the earliest snoop request that was selected.

21. The method of claim 1 wherein the ordering and the mapping comprise a common ordering point for coherency management.

22. The method of claim 21 wherein the common ordering point comprises a compute coherency block coupled to the plurality of processor cores.

23. A computer program product embodied in a non-transitory computer readable medium for coherency management, the computer program product comprising code which causes one or more processors to generate semiconductor logic for:
    accessing a plurality of processor cores, wherein the plurality of processor cores comprises a coherency domain, and wherein two or more processor cores within the plurality of processor cores generate read operations for a shared memory structure coupled to the plurality of processor cores;
    ordering snoop requests in a two-dimensional matrix, wherein the two-dimensional matrix is extensible along each axis of the two-dimensional matrix;
    mapping snoop responses to a first-in first-out (FIFO) mapping queue, wherein each snoop response corresponds to a snoop request, and wherein each processor core of the plurality of processor cores is coupled to at least one FIFO mapping queue; and
    completing a memory access operation, based on a comparison of the snoop requests and the snoop responses.

24. An apparatus for coherency management comprising:
    a plurality of processor cores operating in a coherency domain, wherein the plurality of processor cores is used to perform operations comprising:
        accessing a plurality of processor cores, wherein two or more processor cores within the plurality of processor cores generate read operations for a shared memory structure coupled to the plurality of processor cores;
        ordering snoop requests in a two-dimensional matrix, wherein the two-dimensional matrix is extensible along each axis of the two-dimensional matrix;
        mapping snoop responses to a first-in first-out (FIFO) mapping queue, wherein each snoop response corresponds to a snoop request, and wherein each processor core of the plurality of processor cores is coupled to at least one FIFO mapping queue; and completing a memory access operation, based on a comparison of the snoop requests and the snoop responses.

* * * * *